May 26, 1931.　　　J. O. ARCHIBALD　　　1,806,659
POWER UNIT DEVICE
Filed Dec. 13, 1926
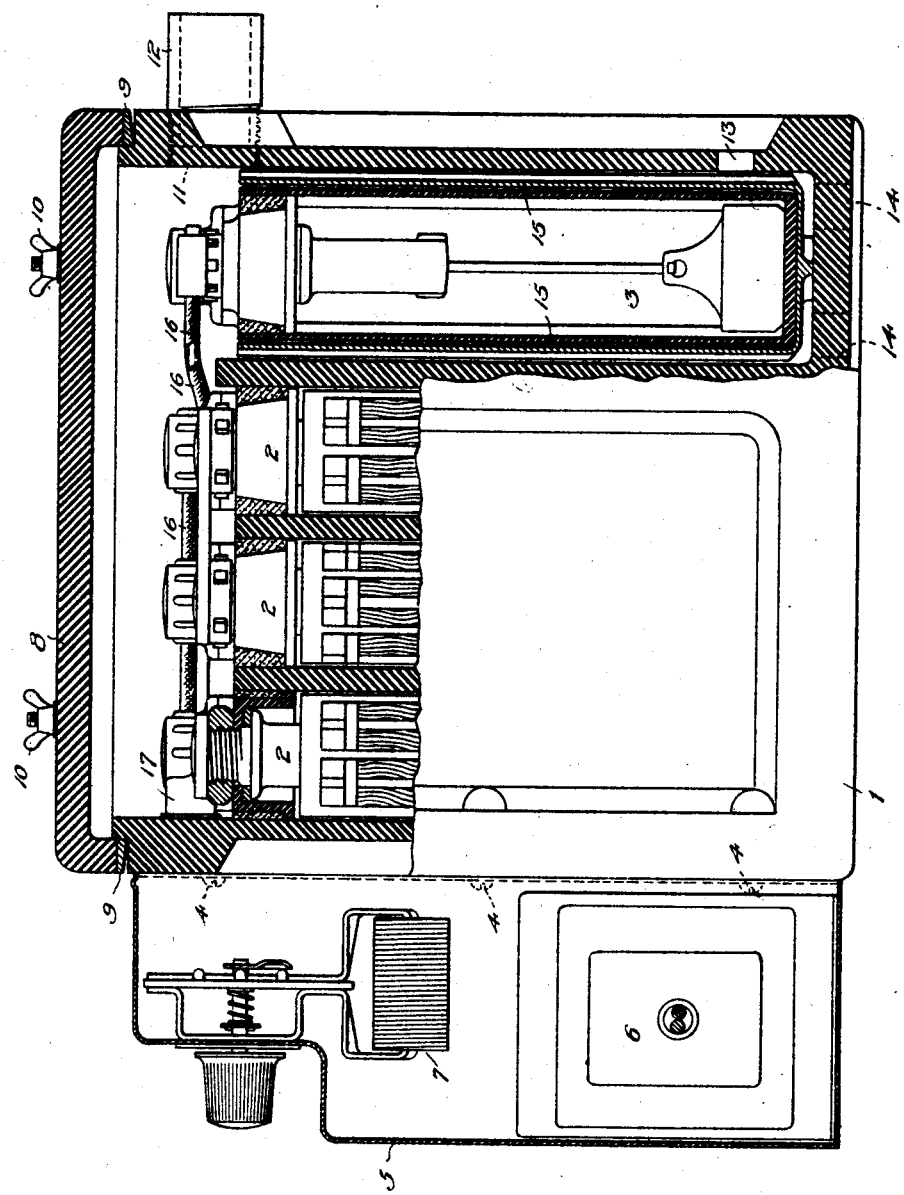
Inventor
John O. Archibald
By
His Attorney Patented May 26, 1931

1,806,659

UNITED STATES PATENT OFFICE

JOHN O. ARCHIBALD, OF LANCASTER, NEW YORK

POWER UNIT DEVICE

Application filed December 13, 1926. Serial No. 154,561.

In the operation of storage batteries and electrolytic rectifiers, gases or acid vapor are evolved which is highly corrosive and detrimental to metal parts and which constitutes a serious problem in the development of unitary power devices combining in one unit batteries or rectifiers, with delicate electrical control apparatus. My invention has for its principal object a solution of this problem which will effectively protect these delicate metal parts and provide adequate ventilation for the batteries and rectifiers so that if necessary the fumes may be discharged at a distance, as for example, without a radio cabinet in which the unit is installed.

My invention can be more readily understood by a consideration of the following specification describing a preferred form of this invention as shown in the accompanying drawings giving a vertical longitudinal view, partly in section, of a Unipower device involving the invention. Considering these drawings in detail, 1 is a container housing the power units 2 and 3 the latter of which is a rectifier which may preferably be of the lead tantalum acid electrolyte type. To this container there may be attached by the screws 4 a metal housing 5 containing the transformer 6, the variable resistance 7 and other delicate metal parts which may be injured by the acid fumes. The container 1 may be provided with a lid 8 having a plastic strip 9 which may be held in compression by the means 10 so that the space above the battery and rectifying units is completely sealed against the escape of gases except through the exhaust vent 11 which may be provided with a tube 12 to conduct the gases into the open air. To permit circulation, the rectifier compartment may be provided with inlets at 13, or at 14, and to increase the circulation, the rectifying cell may be surrounded by flanged heat conducting plates 15. The electric conductors 16 from the battery and rectifying units may be of lead or covered with a suitable acid proof insulation. Where the conductors pass through the wall of the container 1, acid proof gas tight bushings may be provided to effectively seal these openings into the housing 5 so that the delicate metal parts contained therein are completely isolated from the acid fumes.

Instead of a separable metal housing, the delicate metal parts to be isolated may be housed in a separate compartment of the container or other means may be adapted without departing from the scope of the invention, as defined by the following claims:

1. In an electrical power assembly, a casing containing electrical apparatus from which gases are evolved, a housing on the outside thereof from which gases are to be excluded, the casing having a tubular vent means near the top thereof at the end remote from the housing for directing the gases away therefrom and having air inlet openings located at the lower portion of one side and in the bottom.

2. In an electrical power assembly including a casing containing apparatus from which gases are evolved during the operation, the casing being provided with a vent opening in one side near its top and further provided in the same side with an inlet opening near the bottom, a discharge tube connected with the casing and communicating with the vent opening, the casing having a portion of its bottom upwardly offset, and said upwardly offset portion having air inlet openings therein.

3. In an electrical power assembly device, a casing containing an electrolytic rectifier, ribbed metallic conducting plates about the rectifier spaced from the bottom of the casing, the casing having a vent opening above the rectifier for the escape of gases evolving therefrom, and the casing further having air inlet openings in its bottom located beneath the rectifier whereby air may enter and circulate about the rectifier.

4. In an electrical power assembly including a casing containing apparatus from which gases are evolved during the operation, the casing being provided with a vent opening in one side near its top and having a portion of its bottom upwardly offset throughout its length to define a passage, said upwardly offset portion having air inlet openings therein.

In testimony whereof I affix my signature.

JOHN O. ARCHIBALD.